United States Patent Office 3,490,506
Patented Jan. 20, 1970

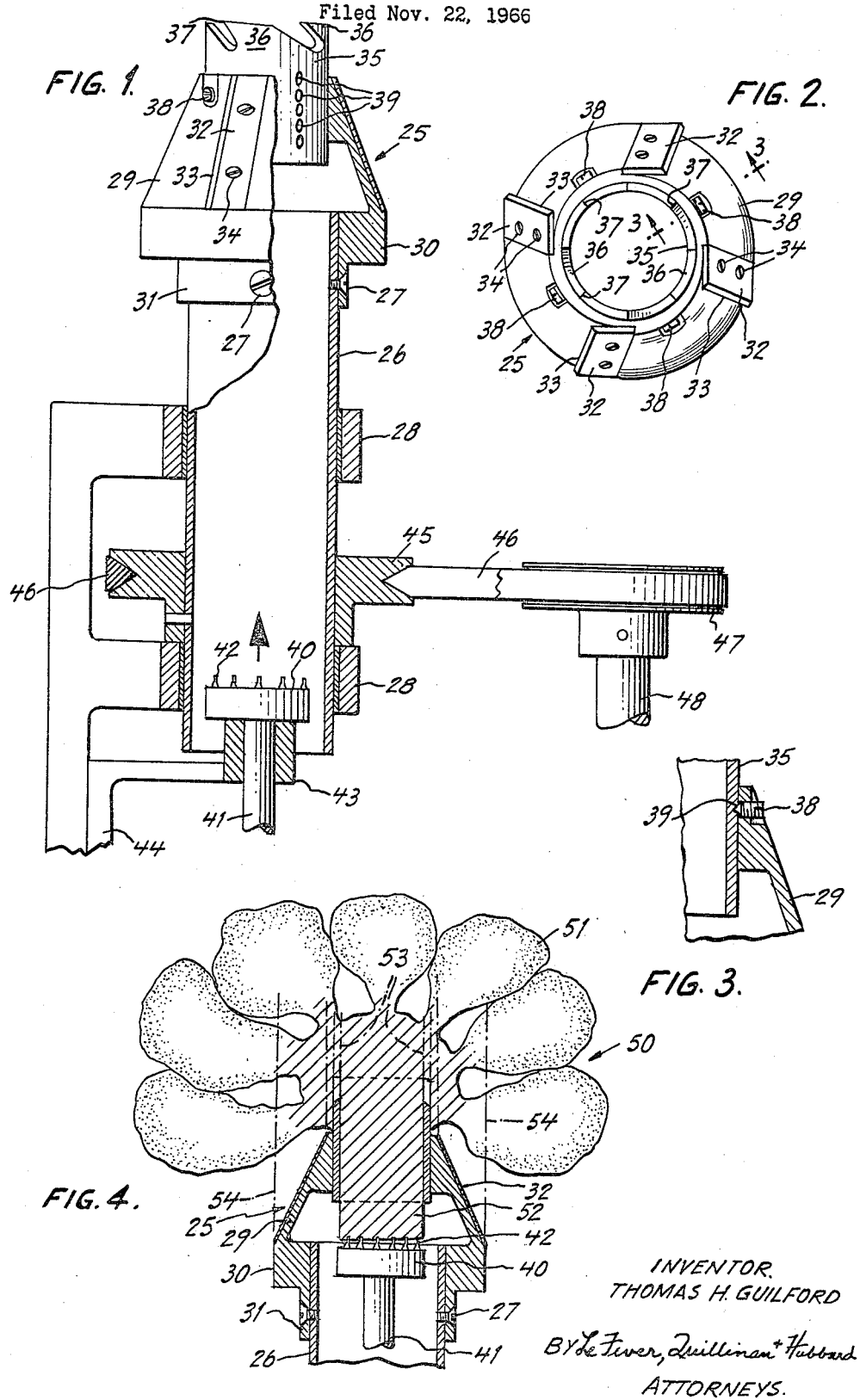

3,490,506
CAULIFLOWER STEM TRIMMING MACHINE
Thomas Harlan Guilford, Le Roy, N.Y., assignor to General Foods Corporation, White Plains, N.Y., a corporation of Delaware
Filed Nov. 22, 1966, Ser. No. 596,192
Int. Cl. A01d 55/00; A23n 15/02
U.S. Cl. 146—106                                      3 Claims

---

ABSTRACT OF THE DISCLOSURE

A cauliflower trimming machine including cauliflower stem holding means, a cutting member supported on tubular means which is coaxial with the holding means, and rotary movement producing means whereby a portion of the stem is planed away to obtain flowerets.

---

This invention relates to a machine for removing stems from cauliflower so as to obtain the flowerets. More particularly, this invention is concerned with a trimming machine which is especially adapted to cut away portions of the deleafed stem of a cauliflower in a manner whereby the cauliflower flowerets can be recovered with a minimum of manual labor, in a very short time, and without substantial injury or damage.

Cauliflower (*Brassica oleracea* var. *botrytis* L., Cruciferae) is one of the many vegetables which are obtained from the flower portion of the plant. Like broccoli, cauliflower is a type of cabbage in which the head consists of a mass of compacted, abortive underdeveloped flowers upon modified stems and the white or purplish flower mass is surrounded by green leaves. Cauliflower is cooked as a table vegetable and is frequently employed as an ingredient in mixed pickles. With the advent of modern food freezing processes, large quantities of cauliflower are marketed and sold frozen. Large scale processing of foods whether they are marketed frozen, canned or fresh requires economy in operation as well as a minimum of handling steps. However, because of its botanical structure, cauliflower requires an unusual amount of manual handling of the vegetable to remove the unusable portions and has long presented problems to the food processor. The need has thus existed for a machine or device which could permit easy recovery of the cauliflower flowerets, but to the present, apparatus of such type either has not been available or is inadequate to handle the tonnage volumes of cauliflower which would be processed in a large food plant during a rather short cauliflower harvesting season.

It is an object of the present invention to provide a machine whereby the stem portion of cauliflower, the leaves of which having been previously cut away, may be separated, trimmed and removed with relation to the flowerets which may then be processed further by conventional means.

Another object of the present invention is to provide a machine which is capable, with only minor or slight adjustments, of processing cauliflower to obtain the flowerets without having to resort to extensive manual cutting or trimming operations.

A still further object of this invention is to provide a cauliflower trimming machine for removing the stems from cauliflower so as to permit recovery of flowerets with a minimum of damage thereto.

A still further object is to provide a machine and process to carry out the foregoing as well as other objects of the invention.

The machine or apparatus for trimming the stem of a deleafed cauliflower, and for recovering the flowerets is more fully described in the ensuing description and claims and is shown by way of illustration in the accompanying drawing in which:

FIGURE 1 is a longitudinal section of a machine constructed in accordance with the invention.

FIGURE 2 is an end view of FIGURE 1.

FIGURE 3 is a partial longitudinal section of FIGURE 1.

FIGURE 4 is a diagrammatic view showing the trimming of the stem of a previously deleafed cauliflower with the machine so as to obtain the flowerets.

With continued reference to the drawing and particularly to FIGURE 1, the machine can be seen to comprise a planer-like member 25 connected to a tube 26, usually fabricated from stainless steel, by means of screws 27. The tube is supported by bearings 28 and is adapted for rotary movement. The planer-like member further consists of a substantially heavy body having a truncated conical portion 29 which terminates as a generally cylindrical tubular portion 30 whose diameter is larger than the diameter of the tubular extension 31. Mounted upon the conical portion are cutting knives 32, the cutting edge 33 of which extends beyond the outermost surface of the conical portion. The knives are affixed to the conical portion and are held in place by means of screws 34. If desired, slots, instead of threaded portions, may be provided in the knives so as to permit easy adjustment and removal.

Mounted within the conical portion is a cylindrical sleeve 35 having teeth 36 further provided with cutting edges 37. The sleeve is connected to the conical portion 29 by means of screws 38 or other affixing devices which extend into indents 39 or slots or holes in the sleeve, as may be seen from FIGURE 3. The sleeve can thus be adjusted for deeper or shallower cutting and its teeth with cutting edges are designed to cut from the inside out thereby keeping the cutters clean while following the stem of the cauliflower.

Means for holding the deleafed cauliflower by its stem end are provided by a "pusher" 40, a plate-like member, mounted on shaft 41 within tube 26. The "pusher" is equipped with tips or teeth-like elements 42 which serve to hold and grasp the cauliflower stem during the operation of the machine.

The holding means or "pusher" is held stationary, i.e., its rotary movement is restricted, within the tube by means of yoke 43 which is attached to support 44. The holding means is adapted to keep the cauliflower head from turning during the trimming operation and to eject the cauliflower stem after the flowerets have been removed. Further, if desired, the yoke may be part of a safety device, not shown, which will return the holding means after the machine operator has pushed the cauliflower in until the flowerets fall away.

The tube, which also serves as a guiding means for the stem of the cauliflower, is adapted for rotary movement by means of V-pulley 45 mounted on the outside of the tube. Belt 46 is positioned on the pulley and also on pulley 47 which is mounted on the shaft 48 of a variable speed motor, not shown, that is used for power to rotate the tube.

As may be seen from FIGURE 2, the cutting members or knives 32 are adapted for easy removal and adjustment. While a plurality of knives are shown, it is apparent that one such knife would be adequate.

Referring to FIGURE 4, a cauliflower 50 with flowerets 51 attached is shown. It may be noted that the stem 52, also termed the core or stalk, is free of leaves, the same having been removed by a previous trimming operation. The leaves may be severed from the stem by hand trimming or may be removed by employing the machine and process described and claimed in my copending application Ser. No. 695,191, filed concurrently herewith.

The stem or core of the cauliflower is placed by the machine operator against the sleeve 35 having teeth with cutting edges and may be inserted into the mouth of the planer-like member 25, that is, the truncated cone having knives mounted thereon. During operation of the machine, the stem is further permitted to extend into tube 26 so as to be pressed against the holding means or "pusher" 40. While and as, the sleeve and planer-like member are rotated, virtually all of the unusable stem or core portion is removed along the lines generally indicated at 53 and 54. The severed flowerets then fall free from the cut-away stem and are collected; they may be processed further by suitable methods which can include pickling, cooking, etc., followed by packing, canning, freezing, or the like. The stem from which the flowerets have been removed is then withdrawn from the mouth of the sleeve and planer-like member and from the tube or may be ejected by the holding means. Any flowerets remaining on the withdrawn or ejected stem may be readily removed by hand-trimming.

It will be readily apparent to those skilled in the art that many changes in construction, materials and the like of the machine, as well as widely differing embodiments and applications of the present invention are suggested without a departure from the spirit and scope of the invention. For example, suitable safety features may be incorporated without affecting the essential features of the machine. Accordingly, the present invention is not to be restricted in any way by the foregoing description which is merely illustrative but instead is to be construed broadly and is to be limited only by the following appended claims.

What is claimed is:
1. A cauliflower trimming machine comprising:
   means for holding a deleafed cauliflower by its stem,
   tubular means supporting a cutting member and coaxial of said holding means, said holding means being axially adjustable relative to the axis of said tubular means,
   means to produce rotary movement between said holding means and said tubular means to plane a portion of said stem whereby the flowerets of the cauliflower on said stem are permitted to fall free and away from said cutting member.
2. A machine as in claim 1 comprising a pair of cutting members:
   one of said members having a knife-like element supported on the outer surface of a truncated cone, said cone being positioned on said tubular means, and
   the other of said members having a tooth-like element provided at the edge of a cylindrical sleeve, said sleeve being mounted within said cone.
3. In a trimming device for cauliflower:
   a hollow cylindrical sleeve mounted within a hollow upstanding truncated cone,
   said cone having a downwardly extending hollow tubular shaft for positioning into a hollow cylindrical tube and adapted for rotation, said tube having positioned therein a plate with teeth-like elements extending from the upper surface thereof and adapted for holding the stem of a deleafed cauliflower,
   said cone having at least one cutting knife, and
   in which said tooth and knife, upon rotation of said sleeve and cone, cut away a portion of said stem whereby the flowerets on said stem are permitted to fall free.

References Cited

UNITED STATES PATENTS 3,212,506 10/1965 Hagopian.
3,252,463 5/1966 Alpen.
3,259,135 7/1966 Heatherington et al.

W. GRAYDON ABERCROMBIE, Primary Examiner

U.S. Cl. X.R.
130—30